US010781927B2

(12) United States Patent
Goode et al.

(10) Patent No.: US 10,781,927 B2
(45) Date of Patent: Sep. 22, 2020

(54) MONOLITHIC, NON-PLUGGING MULTI-STAGE VALVE TRIM (71) Applicant: FISHER CONTROLS INTERNATIONAL LLC, Marshalltown, IA (US)

(72) Inventors: David S. Goode, Marshalltown, IA (US); Cory J. Hagen, Johnston, IA (US); Thomas N. Gabriel, Marshalltown, IA (US); Kimball R. Barron, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 19 days.

(21) Appl. No.: 16/034,225

(22) Filed: Jul. 12, 2018

(65) Prior Publication Data
US 2020/0018406 A1 Jan. 16, 2020

(51) Int. Cl.
F16K 11/07 (2006.01)
F16K 47/08 (2006.01)
(Continued)

(52) U.S. Cl.
CPC ............... F16K 11/07 (2013.01); F16K 5/04 (2013.01); F16K 47/04 (2013.01); F16K 47/08 (2013.01);
(Continued)

(58) Field of Classification Search
CPC . F16K 5/04; F16K 47/04; F16K 47/08; F16K 11/07; Y10T 137/86775;
(Continued)

(56) References Cited

U.S. PATENT DOCUMENTS 3,485,474 A * 12/1969 Baumann .................. F16K 1/54
251/121
3,698,435 A * 10/1972 Evans ...................... F16K 11/07
137/625.18
(Continued)

FOREIGN PATENT DOCUMENTS

EP 0 053 290 A1 6/1982
JP S59 190587 A 10/1984
(Continued)

OTHER PUBLICATIONS

International Search Report received for PCT/US2019/041376, dated Sep. 26, 2019.
(Continued)

Primary Examiner — Matthew W Jellett
Assistant Examiner — Christopher D Ballman
(74) Attorney, Agent, or Firm — Marshall, Gerstein & Borun LLP (57) ABSTRACT A non-plugging, multi-stage valve trim and a fluid flow control device employing the same. The valve trim includes a unitary cage body extending along a longitudinal axis, and a valve plug movably disposed within the unitary cage body to control fluid flow through the unitary cage body. The unitary cage body includes an outer wall arranged to engage the valve body, an inner wall spaced radially inwardly of the outer wall, a cage inlet formed in the outer wall, a cage outlet formed in the outer wall, and a pressure reducing fluid flow passageway formed within the unitary cage body and extending between the cage inlet and the cage outlet.

22 Claims, 3 Drawing Sheets (51) Int. Cl.
*F16K 47/04* (2006.01)
*F16K 5/04* (2006.01)

(52) U.S. Cl.
CPC ............... *Y10T 137/86734* (2015.04); *Y10T 137/86759* (2015.04); *Y10T 137/86767* (2015.04); *Y10T 137/86775* (2015.04)

(58) Field of Classification Search
CPC ..... Y10T 137/86767; Y10T 137/86759; Y10T 137/86734
See application file for complete search history.

(56) References Cited

U.S. PATENT DOCUMENTS

| | | | | |
|---|---|---|---|---|
| 3,715,098 | A * | 2/1973 | Baumann | F16K 47/04 251/121 |
| 4,549,718 | A * | 10/1985 | Seger | F16K 47/04 251/121 |
| RE33,053 | E * | 9/1989 | Seger | F16K 47/04 251/121 |
| 5,113,908 | A * | 5/1992 | Steinke | F16K 47/04 137/625.3 |
| 5,133,383 | A | 7/1992 | King | |
| 5,497,801 | A * | 3/1996 | Kusunose | F04D 15/0011 137/115.04 |
| 5,615,708 | A | 4/1997 | Barron | |
| 7,055,548 | B2 * | 6/2006 | Hamblin | F16K 47/04 137/625.37 |
| 9,528,632 | B2 * | 12/2016 | Glaun | F16K 47/04 |
| 9,556,970 | B2 * | 1/2017 | Mastrovito | F16K 47/08 |
| 9,851,013 | B2 | 12/2017 | Zhou et al. | |
| 2010/0252768 | A1 * | 10/2010 | Caprera | F16K 47/04 251/309 |
| 2017/0138507 | A1 * | 5/2017 | Kluz | F16K 47/08 |

FOREIGN PATENT DOCUMENTS

| | | |
|---|---|---|
| JP | 2016 031133 A | 3/2016 |
| WO | WO-00/9923 A1 | 2/2000 |
| WO | WO-2019/152263 A1 | 8/2019 |

OTHER PUBLICATIONS

Written Opinion received for PCT/US2019/041376, dated Sep. 26, 2019.

* cited by examiner

PRIOR ART

MONOLITHIC, NON-PLUGGING MULTI-STAGE VALVE TRIM

FIELD OF THE DISCLOSURE

The present disclosure generally relates to fluid pressure reduction devices, and, more particularly, to a monolithic, non-plugging multi-stage valve trim and a fluid flow control device employing the same.

BACKGROUND

In process control systems, such as distributed or scalable process control systems commonly found in chemical, petroleum, power generation, or other industrial processes, it is often necessary to reduce the pressure of a fluid. However, pressure reduction typically leads to increased levels of unwanted noise and/or vibration, and may, in some cases, lead to cavitation, which not only produces unwanted noise and/or vibration but can also cause severe erosion if not part failure. Thus, process control systems may employ flow reduction devices that aim to reduce fluid pressure in a manner that does not produce these undesirable effects.

Multi-stage valve trims are examples of flow reduction devices that may be employed in high pressure reduction applications in order to prevent cavitation. Multi-stage valve trims typically feature a valve cage and a valve plug that together define a lengthy fluid flow path or tortuous or labyrinthine configuration having small flow passages and tight clearances defining multiple pressure reducing stages through which the fluid must flow (thereby reducing fluid pressure). These multi-stage valve trims tend to work quite well when the fluid flowing therethrough is clean (e.g., does not include particulates). However, when the fluid is dirty (e.g., includes particulates), multi-stage valve trims having larger flow passages must be used, or else the particulates carried by the fluid may plug the small flow passages, reducing flow capacity and potentially damaging the valve trim.

At present, multi-stage valve trims for use in dirty service applications (i.e., applications involving severe flow conditions, e.g., catalyst fines in refineries, magnetite in power plants, sand in oil production, in which the fluid is dirty) are constructed using machined bar-stock parts. This is because the machining of the complex geometry needed for throttling control requires that the valve cages be separated into multiple different parts which are then assembled together with one or more sealing elements in order to prevent leakage.

SUMMARY

In accordance with a first exemplary aspect of the present invention, a non-plugging, multi-stage valve cage adapted to be disposed in a valve body of a fluid flow control device is provided. The valve cage includes a unitary cage body extending along a longitudinal axis and including an outer wall arranged to engage the valve body and an inner wall spaced radially inwardly of the outer wall. The valve cage also includes a cage inlet formed in the unitary cage body, a cage outlet formed in the outer wall, and a multi-stage pressure reducing fluid flow passageway formed within the unitary cage body and extending between the cage inlet and the cage outlet. The multi-stage pressure reducing fluid flow passageway is defined by a first annular recess defined by a first portion of the outer wall, a second annular recess defined by a second portion of the outer wall, and one or more flow restricting passages formed in the inner wall and extending along a first axis perpendicular to the longitudinal axis, wherein the one or more flow restricting passages connect the first annular recess and the second annular recess.

In accordance with a second exemplary aspect of the present invention, a non-plugging, multi-stage valve trim adapted to be disposed in a valve body of a fluid flow control device is provided. The valve trim includes a unitary cage body extending along a longitudinal axis, and a valve plug movably disposed within the unitary cage body to control fluid flow through the unitary cage body. The unitary cage body includes an outer wall arranged to engage the valve body and an inner wall spaced radially inwardly of the outer wall. The valve cage also includes a cage inlet formed in the unitary cage body, a cage outlet formed in the outer wall, and a multi-stage pressure reducing fluid flow passageway formed within the unitary cage body and extending between the cage inlet and the cage outlet. The multi-stage pressure reducing fluid flow passageway is defined by a first annular recess defined by a first portion of the outer wall, a second annular recess defined by a second portion of the outer wall, and one or more flow restricting passages formed in the inner wall and extending along a first axis perpendicular to the longitudinal axis, wherein the one or more flow restricting passages connect the first annular recess and the second annular recess.

In accordance with a third exemplary aspect of the present invention, a fluid flow control device is provided. The fluid flow control device includes a valve body and a non-plugging, multi-stage valve trim disposed in a valve body of a fluid flow control device is provided. The valve body includes a valve body inlet, a valve body outlet, and a passageway extending between the valve body inlet and the valve body outlet. The valve trim includes a unitary cage body extending along a longitudinal axis, and a valve plug movably disposed within the unitary cage body to control fluid flow through the unitary cage body. The unitary cage body includes an outer wall arranged to engage the valve body and an inner wall spaced radially inwardly of the outer wall. The valve cage also includes a cage inlet formed in the unitary cage body and in fluid communication with the valve body inlet, a cage outlet formed in the outer wall and in fluid communication with the valve body outlet, and a multi-stage pressure reducing fluid flow passageway formed within the unitary cage body and extending between the cage inlet and the cage outlet. The multi-stage pressure reducing fluid flow passageway is defined by a first annular recess defined by a first portion of the outer wall, a second annular recess defined by a second portion of the outer wall, and one or more flow restricting passages formed in the inner wall and extending along a first axis perpendicular to the longitudinal axis, wherein the one or more flow restricting passages connect the first annular recess and the second annular recess.

In accordance with a fourth exemplary aspect of the present invention, a method of manufacturing is provided. The method includes creating a non-plugging multi-stage valve cage adapted to be disposed in a valve body of a fluid flow control device using an additive manufacturing technique, wherein the non-plugging multi-stage valve cage includes a unitary cage body extending along a longitudinal axis and including an outer wall arranged to engage the valve body and an inner wall spaced radially inwardly of the outer wall, a cage inlet formed in the unitary cage body, a cage outlet formed in the outer wall, and a pressure reducing fluid flow passageway formed within the unitary cage body and extending between the cage inlet and the cage outlet, the pressure reducing fluid flow passageway defined by a first annular recess defined by a first portion of the outer wall and defining a first volume; a second annular recess defined by a second portion of the outer wall, the second annular recess defining a second volume; and one or more flow restricting passages formed in the inner wall and extending along a transverse axis perpendicular to the longitudinal axis, wherein the one or more flow restricting passages connect the first volume with the second volume.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

Figure 1:
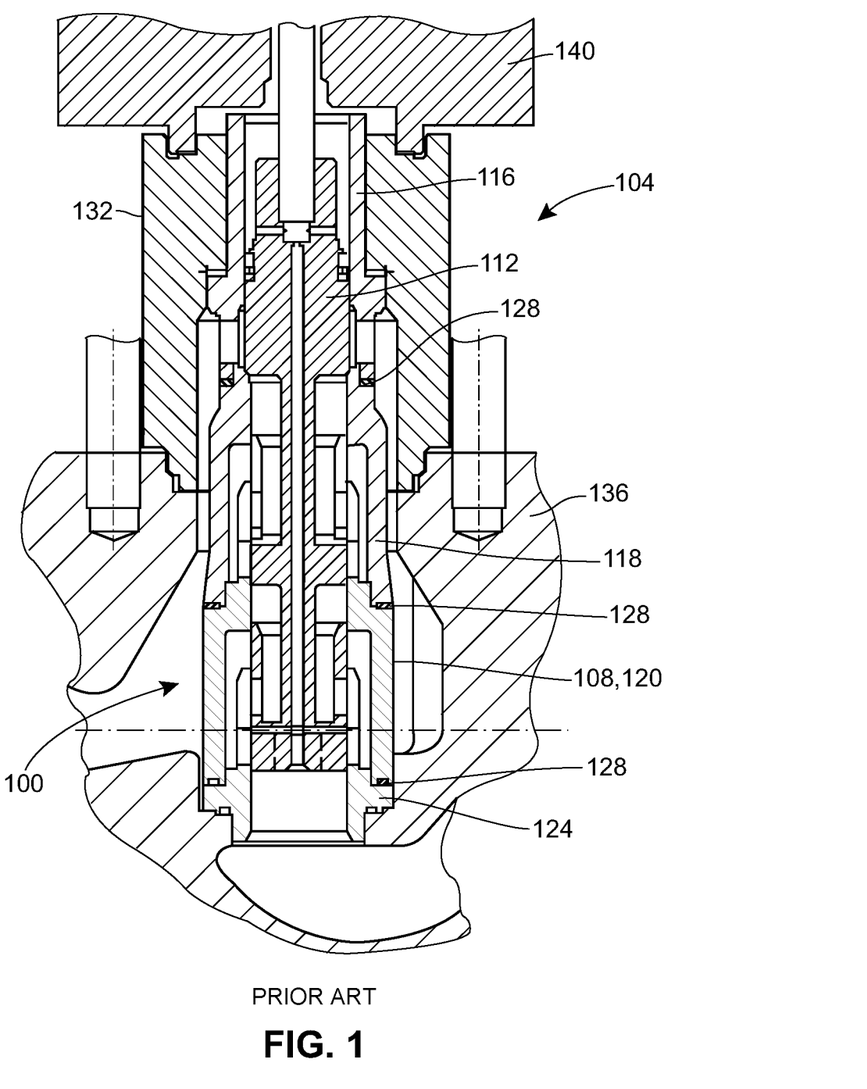
FIG. 1 is a cross-sectional view of a conventional multi-stage valve trim disposed in a fluid flow control device.

FIG. 1 illustrates one example of a conventional multi-stage valve trim 100 adapted to be disposed in a fluid flow control device 104 for use in dirty service applications. The multi-stage valve trim 100 includes a valve cage 108 and a valve plug 112 movably disposed in the valve cage 108. As briefly discussed above, the machining of the complex geometry needed for pressure reduction requires that the valve cage 108 be formed from multiple components that are separately manufactured and then coupled to one another. In this case, the valve cage 108 is formed from four separately manufactured components—an upper cage 116, a first intermediate cage 118, a second intermediate cage 120, and a lower cage 124—stacked together so as to create multiple stages of pressure reduction. In order to prevent leakage between these different components, a sealing element 128 (e.g., O-rings) is arranged between the upper cage 116 and the first intermediate cage 118, between the first and second intermediate cages 118, 120, and between the second intermediate cage 120 and the lower cage 124.

Although the valve cage 108 may effectively reduce fluid pressure in the fluid flow control device 104, the use of multiple cage components 116, 120, and 124, and the sealing elements 128 serves to significantly increase the height of the multi-stage valve trim 100. As such, the fluid flow control device 104 must be modified in order to accommodate the multi-stage valve trim 100. In this case, the fluid flow control device 104 is modified to include a bonnet spacer 132 between a valve body 136 and a bonnet 140 of the fluid flow control device 104. In other cases the fluid flow control device 104 may be modified in different or additional ways in order to accommodate the multi-stage valve trim 100. In yet other cases, however, e.g., when the fluid flow control device 104 utilizes a valve body that is smaller than the valve body 140, it may be impossible to modify the existing fluid flow control device 104 in order to accommodate the multi-stage valve trim 100.

The present disclosure is thus directed to a multi-stage valve trim that addresses these problems with the multi-stage valve trim 100 and other conventional multi-stage valve trims. The multi-stage valve trim disclosed herein is manufactured using an additive manufacturing technique. Thus, the multi-stage valve trim can be manufactured with the entire internal passageway contained in a single, unitary, valve cage. The single, unitary, valve cage reduces the risk for leakage that exists in multi-component valve cages like the valve cage 108, as well as eliminates the need for sealing elements, such as the sealing elements 128 described above, that would otherwise be needed. The usage of a single, unitary valve cage and the elimination of sealing elements allows the overall height of the valve cage to be reduced, such that the disclosed valve cage is shorter than the valve cage 108 and other valve cages in conventional multi-stage valve trims. This not only obviates the need for a bonnet spacer (e.g., the bonnet spacer 132) or other modifications to the fluid flow control device in which the disclosed multi-stage valve trim is employed, but also allows more of the valve cage to be positioned within the gallery of the fluid flow control device. Thus, more pressure reducing stages are positioned within the gallery, providing ample volume for fluid expansion (and pressure reduction). It will also be appreciated that the multi-stage valve trim disclosed herein is easier and less costly to manufacture than the multi-stage valve trim 100 and other conventional multi-stage valve trims.

As used herein, the phrase additive manufacturing technique refers to any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering ("SLS") process, an electronic beam additive manufacturing process, and an arc welding additive manufacturing process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

Figure 2:
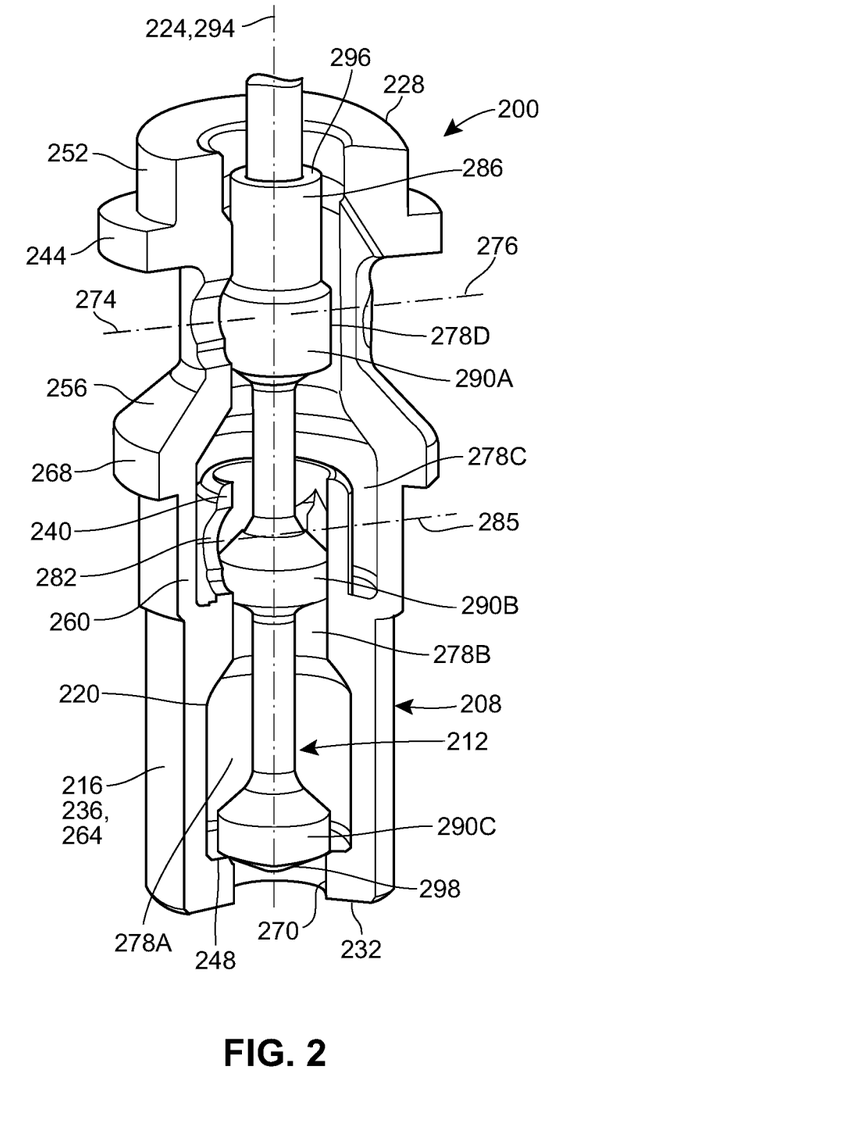
FIG. 2 is a cross-sectional view of an example multi-stage valve trim constructed in accordance with the teachings of the present disclosure.

FIG. 2 illustrates one example of a multi-stage valve trim 200 constructed in accordance with the teachings of the present disclosure. The multi-stage valve trim 200 is configured to provide multi-stage fluid pressure reduction in dirty service applications (and does so without plugging), though it will be appreciated that the multi-stage valve trim 200 can be used to reduce fluid pressure in clean applications as well. As discussed above, the multi-stage valve trim 200 is manufactured using an additive manufacturing technique. Thus, the multi-stage valve trim 200 includes a valve cage 208 and a valve plug 212 that is movably disposed within the valve cage 208, and the valve cage 208 includes a single, unitary body 216 and an internal passageway 220 that is entirely contained within the single, unitary body 216. It will be appreciated that the internal passageway 220 is large enough so as to prevent plugging when the multi-stage valve trim 200 is used in dirty service applications. As will be discussed in greater detail below, the internal passageway 220 defines a plurality of fluid pressure reduction stages that facilitate the desired multi-stage fluid pressure reduction.

The unitary body 216 can be made of one or more suitable materials, such as, for example, stainless steel, aluminum, and various alloys. The unitary body 216 in this version generally extends along a longitudinal axis 224 from a first end 228 to a second end 232. As illustrated in FIG. 2, the unitary body 216 includes an outer wall 236, an inner wall 240 integrally formed with the outer wall 236, a flange 244 that is integrally formed with the outer wall 236, and a seat 248 that is integrally formed with the outer wall 236. In other examples, however, the unitary body 216 may include more or less, and/or different, components. As an example, the unitary body 216 may not include the seat 248, which may, for example, instead be removably coupled to the unitary body 216.

The outer wall 236 is generally arranged to engage a valve body of a fluid flow control device when the multi-stage valve trim 200 is disposed in the fluid flow control device. The outer wall 236 in this example is formed from a plurality of differently sized wall portions, namely a first wall portion 252, a second wall portion 256, a third wall portion 260, and a fourth wall portion 264. The first wall portion 252 extends between the first end 228 and the flange 244 along the longitudinal axis 224. The second wall portion 256 extends downwardly (at least in FIG. 2) from the flange 244 and then outwardly toward the second end 232 (i.e., at an angle relative to the longitudinal axis 224) before terminating at a shoulder 268 arranged to engage a portion of the valve body. Thus, at the shoulder 268, the second wall portion 256 has a diameter that is larger than a diameter of the first wall portion 252. The third wall portion 260 extends downwardly, along the longitudinal axis 224, from a portion of the second wall portion 256 positioned radially inwardly from the shoulder 268 and toward the second end 232, such that at the shoulder 268, the diameter of the second wall portion 256 is also greater than a diameter of the third wall portion 260. The fourth wall portion 264 extends downwardly, along the longitudinal axis 224, from the third wall portion 260 to the second end 232. The fourth wall portion 264 has a diameter that is less than the diameter of the third wall portion 260. In other examples, however, the outer wall 236 can be formed from more or less, or differently sized, wall portions in order to accommodate and engage differently sized valve bodies.

As illustrated in FIG. 2, the inner wall 240 is spaced radially inwardly of the outer wall 236. More particularly, the inner wall 240 is spaced radially inwardly of the outer wall 236 at a position proximate the third wall portion 260. In this example, the inner wall 240 extends along the longitudinal axis 224, such that the inner wall 240 is substantially parallel to the outer wall 236. However, in other examples, the inner wall 240 may curve relative to the longitudinal axis 224, such that the inner wall 240 is angled relative to the outer wall 236.

As also illustrated in FIG. 2, the flange 244 extends outwardly from the outer wall 236. In this example, the flange 244 extends outwardly from the outer wall 236 at a position proximate the first end 228. However, in other examples, the flange 244 may extend outwardly from the outer wall 236 at a position closer to or further from the first end 228. The flange 244 is thus arranged to engage both the valve body and a bonnet of the fluid flow control device when the multi-stage valve trim 200 is disposed in the fluid flow control device. The seat 248, on the other hand, extends inwardly from the outer wall 236. In this example, the seat 248 extends inwardly from the outer wall 236 at the second end 232 of the unitary body 216. However, in other examples, the seat 248 may extend inwardly from the outer wall 236 at a position that is spaced from the second end 232 of the unitary body 216. In any case, the seat 248 is positioned to selectively receive a portion of the valve plug 212 to open or close the internal passageway 220, as will be described in greater detail below.

With continued reference to FIG. 2, the valve cage 208 also includes a cage inlet 270 and a cage outlet 274. In this example, the cage inlet 270 is formed in the unitary body 216 at the second end 232 of the unitary body 216, such that the cage inlet 270 extends along the longitudinal axis 224. In other examples, however, the cage inlet 270 may be formed in a different location and/or may extend along a different axis than the longitudinal axis 224 (e.g., may extend along an axis that is transverse to the longitudinal axis 224). In this example, the cage outlet 274 is formed in the outer wall 236 of the unitary body 216 at a position proximate the first end 228 of the unitary body 216. More particularly, the cage outlet 274 is formed in the second wall portion 256 of the outer wall 236 of the unitary body 216. The cage outlet 274 thus extends along an axis 276 that is transverse to the longitudinal axis 224. In other examples, however, the cage outlet 274 may be formed in a different location and/or may extend along a different axis than the axis 276 (e.g., along the longitudinal axis 224).

The valve cage 208 also includes a plurality of annular recesses defined by the unitary body 216 and extending between the cage inlet 270 and the cage outlet 274. In this example, the valve cage 208 includes four annular recesses 278A, 278B, 278C, and 278 defined by different portions of the unitary body 216. More particularly, the first annular recess 278A is defined by the fourth wall portion 264, the second annular recess 278B is defined by the inner wall 240, the third annular recess 278C is defined by the second and third wall portions 256, 260, and the fourth annular recess 278D is defined by the first and second wall portions 252, 256. Thus, the first annular recess 278A is immediately adjacent the cage inlet 270 within the unitary body 216, the second annular recess 278B is immediately adjacent the first annular recess 278A within the unitary body 216, the third annular recess 278C is immediately adjacent the second annular recess 278B within the unitary body 216, and the fourth annular recess 278D is immediately adjacent both the third annular recess 278C and the cage outlet 274 within the unitary body 216. As illustrated, the first annular recess 278A has a first diameter and defines a first volume, the second annular recess 278B has a second diameter smaller than the first diameter and defines a second volume that is smaller than the first volume, the third annular recess 278C has a third diameter larger than the second diameter and defines a third volume that may be smaller or larger than the second volume. and the fourth annular recess 278D has a fourth diameter smaller than the first and third diameters (and smaller or larger than the second diameter) and defines a fourth volume that is smaller than the first volume (and may be smaller or larger than the second and third volumes). In other examples, however, the valve cage 208 may include more or less annular recesses, the annular recesses 278A-D may be defined by different portions of the valve cage 208, and/or the recesses 278A-D may be sized differently.

As discussed above, the internal passageway 220 is entirely contained within the unitary body 216. The internal passageway 220 extends between the cage inlet 270 and the cage outlet 274. In this example, the internal passageway 220 is defined or formed by the first annular recess 278A, the second annular recess 278B, one or more flow restricting passages 282 formed in the inner wall 236, the third annular recess 278C, and the fourth annular recess 278D. Each of the flow restricting passages 282 is sized to achieve the desired amount of fluid pressure reduction. As illustrated in FIG. 2, the flow restricting passages 282 extend along a transverse axis 285 that is perpendicular to the longitudinal axis 224 and parallel to the axis 276. Thus, the flow restricting passages 282 serve to connect the second annular recess 278B with the third annular recess 278C (and vice-versa). In other examples, however, the internal passageway 220 may be defined or formed by more, less, or different components, such as, for example, a different number of annular recesses or flow restricting passages 282 that extend along an axis that is non-perpendicular to the longitudinal axis 224.

With continued reference to FIG. 2, details of the valve plug 212 will now be described. The valve plug 212, which can be made of one or more suitable materials, such as, for example, stainless steel, aluminum, and various alloys, generally includes an elongated plug stem 286 and a plurality of sealing surfaces that extend radially outwardly from the elongated plug stem 286. The elongated plug stem 286 and the plurality of sealing surfaces may be integrally formed with one another, e.g., using an additive manufacturing technique, or may be separately formed and coupled to one other. In this example, the valve plug 212 includes the elongated plug stem 286 and three sealing surfaces 290A, 290B, 290C integrally formed with the elongated plug stem 286. When the valve plug 212 is movably disposed within the valve cage 208, the elongated plug stem 286 extends along a longitudinal axis 294 that is co-axial with the longitudinal axis 224. The first sealing surface 290A extends radially outwardly from the plug stem 286 at a position proximate a first end 296 of the plug stem 286, such that the first sealing surface 290A is arranged to selectively engage an inner surface of the outer wall 236 of the unitary body 216 to open or sealingly close the cage outlet 274. The third sealing surface 290C extends radially outwardly from the plug stem 286 at a position located at a second end 298 of the plug stem 286, such that the third sealing surface 290C is arranged to selectively engage the valve seat 248 of the valve cage 208 to open or sealingly close the cage inlet 270. The second sealing surface 290B extends radially outwardly from the plug stem 286 at a position between the first and third sealing surfaces 290A, 290C. More particularly, the second sealing surface 290B extends radially outwardly from the plug stem 286 at a position approximately halfway between the first and second ends 296, 298, such that the second sealing surface 290B is arranged to selectively engage the inner wall 240 of the unitary body 216 to open or sealingly close the flow restricting passages 282. In other examples, however, the plug stem 286 may have a different size and/or shape, and/or the valve plug 212 may include more or less than three sealing surfaces. Moreover, while not illustrated herein, it will be appreciated that one or more pressure reducing passages may be formed in the valve plug 212. In some cases, pressure reducing passages may be formed in the valve plug 212 so as to define a plurality of pressure reducing stages within the valve plug 212 as well.

Figure 3:
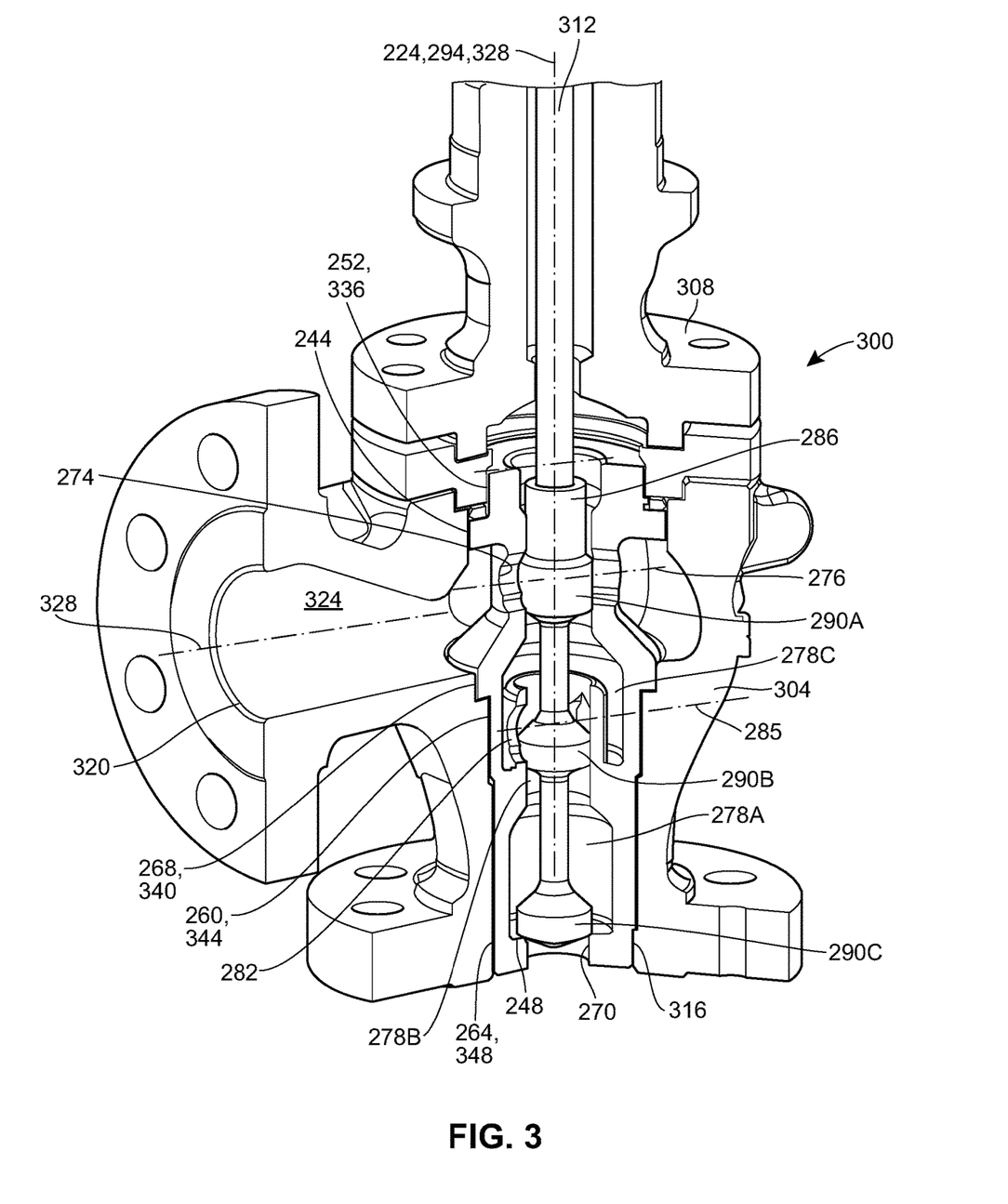
FIG. 3 is a cross-sectional view of an example fluid flow control device utilizing the multi-stage valve trim of FIG. 2.

FIG. 3 illustrates the multi-stage valve trim 200 disposed in one example of a fluid flow control device 300 constructed in accordance with the teachings of the present disclosure. Briefly, the fluid flow control device 300 includes a valve body 304, a bonnet 308 coupled to the valve body 304, and a stem 312 that is disposed in the valve body 304 and the bonnet 308. The valve body 304 defines an inlet 316, an outlet 320, and a fluid flow passageway 324 that includes between the inlet 316 and the outlet 320. In this example, the inlet 316 extends along an inlet axis 328 (which is in turn parallel to if not coaxial with the axes 224, 294) and the outlet 320 extends along an outlet axis 332 that is perpendicular to the inlet axis 328, though in other examples, the outlet axis 332 may be non-perpendicular (e.g., parallel) to the inlet axis 328. The stem 312 has one end coupled to an actuator (not shown) and another end coupled to the valve plug 212, such that the actuator is operatively coupled to the valve plug 212 to control the position of the valve plug 212 within the valve cage 208, which in turn controls fluid flow through the internal passageway 220 and, more generally, the fluid flow passageway 324.

As illustrated in FIG. 3, when the multi-stage valve trim 200 is disposed in the fluid flow control device 300, the valve cage 208 engages different portions of the valve body 304 and the bonnet 308, and the valve plug 212 is movably disposed within the valve cage 208. More particularly, the outer wall 236 of the valve cage 208 engages different portions of the valve body 304, and the flange 244 of the valve cage 208 engages both a portion of the valve body 304 and a portion of the bonnet 308. In this example, the first wall portion 252 engages a portion 336 of the bonnet 308, the shoulder 268 engages a first portion 340 of the valve body 304, the third wall portion 260 engages a second portion 344 of the valve body 304 that is closer to the cage inlet 270 than the first portion 340, and the fourth wall portion 264 engages a third portion 348 of the valve body 304 that is closer to the cage inlet 270 than the second portion 344. In other examples, however, different portions of the outer wall 236 may engage these or other portions of the valve body 304 and/or the bonnet 308. In any case, with the valve cage 208 so disposed, a substantial portion of the valve cage 208 is disposed within the fluid flow passageway 324, thereby providing ample volume for fluid expansion (and pressure reduction). Additionally, because a substantial portion of the valve cage 208 is disposed within the fluid flow passageway 324, particularly a gallery of the fluid flow passageway 324, the bonnet 308 only needs to accommodate a small portion of the valve cage 208. The bonnet 308 in this example is able to do so, such that there is no need for a bonnet spacer like the bonnet spacer 132 described above. In turn, the bonnet 308 directly engages the valve body 304, as illustrated in FIG. 3. It will therefore be appreciated that the fluid flow control device 300 need not be modified in any manner whatsoever in order to accommodate the multi-stage valve trim 200.

When the fluid flow control device 300 is in operation (with the multi-stage valve trim 200 disposed therein), the valve plug 212 is movable (via the stem 312 and the actuator coupled thereto) between a fully closed position (shown in FIG. 3) and a fully open position (not shown) to close or open the internal passageway 220 and, more generally, the fluid flow passageway 324. When the valve plug 212 is in the fully closed position shown in FIG. 3, the first sealing surface 290A sealingly engages and closes the cage outlet 274, the second sealing surface 290B sealingly engages the inner wall 236 of the unitary body 216, thereby closing the flow restricting passages 282, and the third sealing surface 290C sealingly engages the valve seat 248 of the valve cage 208, thereby closing the cage inlet 270. In turn, fluid is preventing from flowing through the internal passageway 220, such that fluid is preventing from flowing from the inlet 316 to the outlet 320 via the fluid flow passageway 324. When, however, the valve plug 212 is moved from this fully closed position to its fully open position, the valve plug 212 is moved away from the cage inlet 270 and toward the first end 228 of the unitary body 216. This moves the first sealing surface 290A away from the cage outlet 274, opening the cage outlet 274, the second sealing surface 290B along the inner wall 236 and away from the flow restricting passages 282, and the third sealing surface 290C away from the valve seat 248, thereby opening the cage inlet 270. In turn, fluid is allowed to flow through the internal passageway 220, such that fluid is allowed to flow from the inlet 316 to the outlet 320 via the fluid flow passageway 324.

When the valve plug 212 is in its fully open position, fluid that has entered the valve body 304 via the inlet 316 flows into the valve cage 208 via the cage inlet 270. In many cases, though not always, the fluid entering the cage inlet 270 will have a high pressure. After passing through the cage inlet 270, the fluid is forced into the first annular recess 278A, which forces the fluid to flow radially outwardly, toward the outer wall 232 of the valve cage 208, thereby reducing the pressure of the fluid (i.e., a first pressure reduction stage). The fluid is next forced into the second annular recess 278B, which forces the fluid to flow radially inwardly, away from the outer wall 232 of the valve cage 208, thereby further reducing the pressure of the fluid (i.e., a second pressure reduction stage). The fluid is then forced to flow through the flow restricting passages 282, which forces the fluid to flow radially outwardly, again toward the outer wall 232 of the valve cage 208, thereby further reducing the pressure of the fluid (i.e., a third pressure reduction stage). After passing through the flow restricting passages 282, the fluid is forced to flow into the third annular recess 278C, which allows the fluid to expand, thereby further reducing the pressure of the fluid (i.e., a fourth pressure reduction stage). The fluid is then forced into the fourth annular recess 278D, which forces the fluid to flow radially inwardly, thereby further reducing the pressure of the fluid (i.e., a fifth pressure reduction stage). At this point, the fluid is forced into and through the cage outlet 274, such that the fluid leaves the valve cage 208 and flows toward the outlet 320 of the valve body 304. In this manner, the fluid leaving the valve cage 208 has a lower pressure than the fluid did when entering the valve cage 208.

Finally, while the multi-stage valve trim 200 in this example is a flow up valve trim (because fluid flows axially upward through the internal passageway 220), the multi-stage valve trim 200 can, in other examples, be a flow down valve trim (wherein fluid would flow axially downward through the internal passageway 220). In one such example, the multi-stage valve trim 200 may be configured so that the cage inlet 270 is at or proximate to the first end 228 and the cage outlet 274 is at or proximate to the second end 228. In addition, the valve seat 248 may be positioned elsewhere in the valve cage 208, in which case the sealing surface 290 of the valve plug 212 may be moved to selectively sealingly engage the re-positioned valve seat 248.

Preferred aspects of this invention are described herein, including the best mode or modes known to the inventors for carrying out the invention. Although numerous examples are shown and described herein, those of skill in the art will readily understand that details of the various aspects need not be mutually exclusive. Instead, those of skill in the art upon reading the teachings herein should be able to combine one or more features of one aspect with one or more features of the remaining aspects. Further, it also should be understood that the illustrated aspects are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspect or aspects of the invention, and do not pose a limitation on the scope of the invention. No language in the specification should be construed as indicating any non-claimed element as essential to the practice of the invention.

The invention claimed is:

1. A non-plugging, multi-stage valve cage adapted to be disposed in a valve body of a fluid flow control device, the valve cage comprising:
   a unitary cage body extending along a longitudinal axis and comprising an outer wall arranged to engage the valve body and an inner wall spaced radially inwardly of the outer wall;
   a cage inlet formed in the unitary cage body;
   a cage outlet formed in the outer wall; and
   a multi-stage pressure reducing fluid flow passageway formed within the unitary cage body and extending between the cage inlet and the cage outlet, the multi-stage pressure reducing fluid flow passageway defined by:
   a first annular recess defined by a first portion of the unitary cage body;
   a second annular recess defined by a second portion of the unitary cage body;
   one or more flow restricting passages formed through the inner wall and extending along a first axis perpendicular to the longitudinal axis; and
   a third annular recess defined by a third portion of the unitary cage body at a position downstream of the one or more flow restricting passages,
   wherein the one or more flow restricting passages connect the second annular recess and the third annular recess, and
   wherein the unitary cage body further comprises an annular shoulder extending outwardly from the outer wall at a position between the second annular recess and the cage outlet, the annular shoulder arranged to directly engage a portion of the valve body to secure the unitary cage body within the valve body.

2. The non-plugging, multi-stage valve cage of claim 1, wherein the first annular recess defines a first volume and the second annular recess defines a second volume smaller than the first volume.

3. The non-plugging, multi-stage valve cage of claim 1, wherein the unitary cage body further comprises a valve seat formed proximate the cage inlet.

4. The non-plugging, multi-stage valve cage of claim 1, wherein the cage inlet extends along the longitudinal axis and the cage outlet extends along a second axis perpendicular to the longitudinal axis.

5. The non-plugging, multi-stage valve cage of claim 1, wherein the third annular recess is at least partially defined between the outer wall and the inner wall of the unitary cage body.

6. A non-plugging, multi-stage valve trim adapted to be disposed in a valve body of a fluid flow control device, the valve trim comprising:
   a unitary cage body extending along a longitudinal axis; and
   a valve plug movably disposed within the unitary cage body to control fluid flow through the unitary cage body,
   wherein the unitary cage body comprises an outer wall arranged to engage the valve body, an inner wall spaced radially inwardly of the outer wall, a cage inlet formed in the unitary cage body, a cage outlet formed in the outer wall, and a pressure reducing fluid flow passageway formed within the unitary cage body and extending between the cage inlet and the cage outlet, the pressure reducing fluid flow passageway defined by:
- a first annular recess defined by a first portion of the unitary cage body and defining a first volume;
- a second annular recess defined by a second portion of the unitary cage body, the second annular recess defining a second volume;
- one or more flow restricting passages formed through the inner wall and extending along a first axis perpendicular to the longitudinal axis; and
- a third annular recess defined by a third portion of the unitary cage body at a position downstream of the one or more flow restricting passages, the third annular recess defining a third volume,
- wherein the one or more flow restricting passages connect the second volume with the third volume, and
- wherein the unitary cage body further comprises an annular shoulder extending outwardly from the outer wall at a position upstream of the cage outlet, the annular shoulder arranged to directly engage a portion of the valve body to secure the unitary cage body within the valve body.

7. The non-plugging, multi-stage valve trim of claim 6, wherein the second volume is smaller than the first volume.

8. The non-plugging, multi-stage valve trim of claim 6, wherein the unitary cage body further comprises a valve seat formed proximate the cage inlet.

9. The non-plugging, multi-stage valve trim of claim 6, wherein the cage inlet extends along the longitudinal axis and the cage outlet extends along a second axis perpendicular to the longitudinal axis.

10. The non-plugging, multi-stage valve trim of claim 6, wherein the valve plug is disposed entirely within the valve cage.

11. The non-plugging, multi-stage valve trim of claim 6, wherein the valve plug is a unitary valve plug.

12. The non-plugging, multi-stage valve cage of claim 6, wherein the annular shoulder extends outwardly from the outer wall at a position between the second annular recess and the cage outlet.

13. A fluid flow control device, comprising:
- a valve body comprising a valve body inlet, a valve body outlet, and a passageway extending between the valve body inlet and the valve body outlet;
- a non-plugging multi-stage valve trim at least partially disposed in the passageway of the valve body, the valve trim comprising:
- a unitary cage body extending along a longitudinal axis; and
- a valve plug movably disposed within the unitary cage body to control fluid flow through the passageway of the valve body,
- wherein the unitary cage body comprises an outer wall engaging the valve body, an inner wall spaced radially inwardly of the outer wall, a cage inlet formed in the unitary cage body and in fluid communication with the valve body inlet, a cage outlet formed in the outer wall and in fluid communication with the valve body outlet, and a multi-stage pressure reducing fluid flow passageway formed within the unitary cage body and extending between the cage inlet and the cage outlet, the multi-stage pressure reducing fluid flow passageway defined by:
  - a first annular recess defined by a first portion of the unitary cage body and defining a first volume;
  - a second annular recess defined by a second portion of the unitary cage body spaced from the first portion of the unitary cage body along the longitudinal axis, the second annular recess defining a second volume;
  - one or more flow restricting passages formed through the inner wall and extending along a first axis perpendicular to the longitudinal axis; and
  - a third annular recess defined by a third portion of the unitary cage body spaced from the second portion of the unitary cage body along the longitudinal axis, the third annular recess defining a third volume,
  - wherein the one or more flow restricting passages connect the second volume with the third volume, and
  - wherein the unitary cage body further comprises an annular shoulder extending outwardly from the outer wall at a position upstream of the cage outlet, the annular shoulder arranged to directly engage a portion of the valve body to secure the unitary cage body within the valve body.

14. The fluid flow control device of claim 13, wherein the unitary cage body further comprises a valve seat formed proximate the cage inlet, the valve plug comprising a seating surface movable relative to the valve seat to control fluid flow through the multi-stage pressure reducing fluid flow passageway.

15. The fluid flow control device of claim 13, wherein the cage inlet extends along the longitudinal axis and the cage outlet extends along a second axis perpendicular to the longitudinal axis.

16. The fluid flow control device of claim 13, wherein the valve plug is disposed entirely within the valve cage.

17. The fluid flow control device of claim 13, wherein the valve plug is a unitary valve plug.

18. The fluid flow control device of claim 13, further comprising a bonnet coupled to the valve body and sized to receive a portion of the non-plugging multi-stage valve trim, wherein the bonnet has a portion that directly engages the valve body.

19. The fluid flow control device of claim 13, wherein the annular shoulder extends outwardly from the outer wall at a position between the second annular recess and the cage outlet.

20. A method of manufacturing, comprising:
creating a non-plugging multi-stage valve cage adapted to be disposed in a valve body of a fluid flow control device using an additive manufacturing technique, wherein the nonplugging multi-stage valve cage comprises a unitary cage body extending along a longitudinal axis and comprising an outer wall arranged to engage the valve body and an inner wall spaced radially inwardly of the outer wall, a cage inlet formed in the unitary cage body, a cage outlet formed in the outer wall, and a pressure reducing fluid flow passageway formed within the unitary cage body and extending between the cage inlet and the cage outlet, the pressure reducing fluid flow passageway defined by: a first annular recess defined by a first portion of the unitary cage body and defining a first volume; a second annular recess defined by a second portion of the unitary cage body, the second annular recess defining a second volume; one or more flow restricting passages formed through the inner wall and extending along a transverse axis perpendicular to the longitudinal axis; and a third annular recess defined by a third portion of the unitary cage body at a position downstream of the one or more flow restricting passages, the third annular recess defining a third volume, wherein the one or more flow restricting passages connect the second volume with the third volume, and wherein the unitary cage body further comprises an annular shoulder extending outwardly from the outer wall at a position upstream of the cage outlet, the annular shoulder arranged to directly engage a portion of the valve body to secure the unitary cage body within the valve body.

21. The method of claim 20, wherein the additive manufacturing technique comprises 3-D printing.

22. The method of claim 20, wherein the annular shoulder extends outwardly from the outer wall at a position between the second annular recess and the cage outlet.

\* \* \* \* \*

UNITED STATES PATENT AND TRADEMARK OFFICE
CERTIFICATE OF CORRECTION

PATENT NO. : 10,781,927 B2
APPLICATION NO. : 16/034225
DATED : September 22, 2020
INVENTOR(S) : David S. Goode et al.

Page 1 of 1

It is certified that error appears in the above-identified patent and that said Letters Patent is hereby corrected as shown below:

In the Specification

At Column 6, Line 55, "volume. and" should be -- volume and --.

At Column 7, Line 3, "inner wall 236," should be -- inner wall 240, --.

At Column 8, Line 59, "inner wall 236" should be -- inner wall 240 --.

At Column 9, Line 5, "inner wall 236" should be -- inner wall 240 --.

At Column 9, Line 50, "second end 228." should be -- second end 232. --.

In the Claims

At Column 11, Line 41, "valve cage" should be -- valve trim --.

At Column 12, Line 49, "nonplugging" should be -- non-plugging --.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*